US009660919B2

(12) United States Patent
Cili et al.

(10) Patent No.: US 9,660,919 B2
(45) Date of Patent: May 23, 2017

(54) ADAPTIVE DATA CONNECTION RETRY BY A WIRELESS COMMUNICATION DEVICE

(71) Applicant: Apple Inc., Cupertino, CA (US)

(72) Inventors: Gencer Cili, Santa Clara, CA (US); Qi He, San Jose, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 498 days.

(21) Appl. No.: 13/752,319

(22) Filed: Jan. 28, 2013

(65) Prior Publication Data

US 2014/0215081 A1 Jul. 31, 2014

(51) Int. Cl.
*H04L 1/18* (2006.01)
*H04L 12/851* (2013.01)
*H04W 76/02* (2009.01)

(52) U.S. Cl.
CPC ............ *H04L 47/24* (2013.01); *H04L 1/1803* (2013.01); *H04W 76/027* (2013.01)

(58) Field of Classification Search
CPC . H04L 41/042; H04L 41/0893; H04L 41/028; H04L 41/024; H04L 41/2475; H04L 1/1803; H04L 47/2475; H04L 47/24
See application file for complete search history.

(56) References Cited

U.S. PATENT DOCUMENTS

| 6,845,245 | B2 | 1/2005 | Hunzinger |
| 7,561,891 | B2 | 7/2009 | Cormier et al. |
| 7,796,536 | B2 | 9/2010 | Roy et al. |
| 8,032,150 | B2 * | 10/2011 | Cole .......................... 455/456.1 |
| 8,320,914 | B2 | 11/2012 | Madhavan et al. |
| 8,767,546 | B2 * | 7/2014 | Nguyen et al. ................ 370/232 |
| 2003/0191831 | A1 * | 10/2003 | Hu et al. ....................... 709/223 |
| 2005/0060425 | A1 * | 3/2005 | Yeh et al. ..................... 709/232 |
| 2005/0175024 | A1 * | 8/2005 | Ho et al. ....................... 370/412 |
| 2007/0005773 | A1 * | 1/2007 | Apreutesei et al. .......... 709/227 |
| 2008/0037494 | A1 * | 2/2008 | Hietalahti et al. ............ 370/338 |
| 2011/0149725 | A1 | 6/2011 | Zhao et al. |
| 2012/0157113 | A1 * | 6/2012 | Brisebois ................. G01S 5/00 455/456.1 |
| 2013/0145463 | A1 * | 6/2013 | Ghosh et al. ................... 726/22 |
| 2013/0178195 | A1 * | 7/2013 | Luna et al. ................. 455/414.1 |
| 2014/0128051 | A1 * | 5/2014 | Choi .................... H04W 74/085 455/418 |

* cited by examiner

*Primary Examiner* — Aaron Strange
(74) *Attorney, Agent, or Firm* — Downey Brand LLP

(57) ABSTRACT

A method for adaptive data connection retry by a wireless communication device is provided. The method can include detecting a failed attempt by the wireless communication device to establish a data connection for an application. The method can further include selecting a data retry pattern having a predefined association with the application from a set of predefined data retry patterns. The set of predefined data retry patterns can be defined based at least in part on application usage data collected by a network entity from wireless communication devices. The method can additionally include retrying data connection establishment in accordance with the selected data retry pattern.

31 Claims, 12 Drawing Sheets

ADAPTIVE DATA CONNECTION RETRY BY A WIRELESS COMMUNICATION DEVICE

FIELD OF THE DESCRIBED EMBODIMENTS

The described embodiments relate generally to wireless communications and more particularly to adaptive data connection retry by a wireless communication device.

BACKGROUND

Modern cellular networks support packet switched (PS) data transfer between a wireless communication device and the serving cellular network. A wide range of applications running on wireless communication devices now take advantage of data support by modern cellular networks and make heavy use of data traffic to support their functionality.

When an application running on a wireless communication device needs to send or receive data traffic, the wireless communication device must establish a data connection with the serving network to support the data traffic. In order to establish a data connection, the wireless communication device can acquire an Internet Protocol (IP) address from the serving network. If the device fails to acquire an IP address and establish a data connection for any of a variety of reasons, such as the core network rejecting a request, the device can perform a data retry mechanism to obtain an IP address and establish a data connection to support data transfer for a requesting application.

A data retry mechanism can be defined by a data retry pattern that can define a number of data connection retry attempts to perform and respective intervals between attempts. Currently, many devices and serving networks use a single data retry pattern regardless of an application requesting a data connection. However, some applications may have higher priority than others. Further, some applications, which may not be used as frequently, may not continue to be used by a user following a data context rejection. Accordingly, application of a one-size-fits-all data retry mechanism can result in undue network overhead due to the burden of signaling for supporting data connection retry attempts. Further application of an overly aggressive data retry mechanism for an application not meriting a large number of frequent retry attempts can result in wasted battery consumption by a wireless communication device. On the flip side, application of a data retry pattern that is too conservative for a high priority application can increase data stall time, thus negatively impacting application functioning and user experience.

SUMMARY OF THE DESCRIBED EMBODIMENTS

Some embodiments disclosed herein provide for adaptive data connection retry by a wireless communication device. For example, a wireless communication device in accordance with some example embodiments can apply a data retry pattern having a predefined association with an application when retrying data connection establishment subsequent to a failed attempt to establish a data connection for the application. In this regard, some such example embodiments provide a set of data retry patterns specific to certain applications or categories of applications, which can be defined based on application usage characteristics, such as duration of use, frequency of use, and/or other characteristics that can be used to derive an appropriate aggressiveness of a data retry pattern specific for an application or application category. Thus, in the event of a data connection establishment failure, a data retry pattern tailored to the requesting application's particular characteristics can be applied so that data connection retry attempts are appropriately aggressive for the given application without unnecessarily burdening a serving network with signaling overhead or wasting device power resources.

In a first embodiment, a method for adaptive data connection retry by a wireless communication device is provided. The method of the first embodiment can include detecting a failed attempt by the wireless communication device to establish a data connection for an application. The method of the first embodiment can further include selecting a data retry pattern having a predefined association with the application from a set of predefined data retry patterns. The set of predefined data retry patterns can be defined based at least in part on application usage data collected by a network entity from a plurality of wireless communication devices. The method of the first embodiment can additionally include retrying data connection establishment in accordance with the selected data retry pattern.

In a second embodiment, a wireless communication device is provided. The wireless communication device of the second embodiment can include a transceiver and processing circuitry coupled to the transceiver. The transceiver can be configured to transmit data to and receive data from a wireless network. The processing circuitry can be configured to control the wireless communication device of the second embodiment to at least detect a failed attempt by the wireless communication device to establish a data connection for an application. The processing circuitry can be further configured to control the wireless communication device of the second embodiment to select a data retry pattern having a predefined association with the application from a set of predefined data retry patterns. The set of predefined data retry patterns can be defined based at least in part on application usage data collected by a network entity from a plurality of wireless communication devices. The processing circuitry can be additionally configured to control the wireless communication device of the second embodiment to retry data connection establishment in accordance with the selected data retry pattern.

In a third embodiment, a computer program product is provided. The computer program product of the third embodiment can include at least one non-transitory computer readable storage medium having program code stored thereon. The program code can include program code for detecting a failed attempt by the wireless communication device to establish a data connection for an application. The program code can further include program code for selecting a data retry pattern having a predefined association with the application from a set of predefined data retry patterns. The set of predefined data retry patterns can be defined based at least in part on application usage data collected by a network entity from a plurality of wireless communication devices. The program code can additionally include program code for retrying data connection establishment in accordance with the selected data retry pattern.

In a fourth embodiment, an apparatus is provided that can include means for detecting a failed attempt by the wireless communication device to establish a data connection for an application. The apparatus of the fourth embodiment can further include means for selecting a data retry pattern having a predefined association with the application from a set of predefined data retry patterns. The set of predefined data retry patterns can be defined based at least in part on application usage data collected by a network entity from a plurality of wireless communication devices. The apparatus of the fourth embodiment can additionally include means for retrying data connection establishment in accordance with the selected data retry pattern.

In a fifth embodiment, a method for adaptive data connection retry by a wireless communication device is provided. The method of the fifth embodiment can include detecting a change in a serving network connection state from a first serving network connection state to a second serving network connection state occurring due to mobility of the wireless communication device while the wireless communication device is retrying establishment of a data connection in accordance with a data retry pattern subsequent to a failed data connection establishment attempt in the first serving network connection state. The method of the fifth embodiment can further include determining whether the wireless communication device has experienced a failed data connection establishment attempt in the second serving network connection state within a previous period of time. In an instance in which the wireless communication device has experienced a failed data connection establishment attempt in the second serving network connection state within the previous period of time, the method of the fifth embodiment can also include continuing to retry data connection establishment in accordance with the data retry pattern. In an instance in which the wireless communication device has not experienced a failed data connection establishment attempt in the second serving network connection state within the previous period of time, the method can also include restarting the data retry pattern.

In a sixth embodiment, a wireless communication device is provided. The wireless communication device of the sixth embodiment can include a transceiver and processing circuitry coupled to the transceiver. The transceiver can be configured to transmit data to and receive data from a wireless network. The processing circuitry can be configured to control the wireless communication device of the sixth embodiment to at least detect a change in a serving network connection state from a first serving network connection state to a second serving network connection state occurring due to mobility of the wireless communication device while the wireless communication device is retrying establishment of a data connection in accordance with a data retry pattern subsequent to a failed data connection establishment attempt in the first serving network connection state. The processing circuitry can be further configured to control the wireless communication device of the sixth embodiment to determine whether the wireless communication device has experienced a failed data connection establishment attempt in the second serving network connection state within a previous period of time. The processing circuitry can be additionally configured to control the wireless communication device of the sixth embodiment to continue to retry data connection establishment in accordance with the data retry pattern in an instance in which the wireless communication device has experienced a failed data connection establishment attempt in the second serving network connection state within the previous period of time. The processing circuitry can be additionally configured to control the wireless communication device of the sixth embodiment to restart the data retry pattern in an instance in which the wireless communication device has not experienced a failed data connection establishment attempt in the second serving network connection state within the previous period of time.

In a seventh embodiment, a computer program product is provided. The computer program product of the seventh embodiment can include at least one non-transitory computer readable storage medium having program code stored thereon. The program code can include program code for detecting a change in a serving network connection state from a first serving network connection state to a second serving network connection state occurring due to mobility of the wireless communication device while the wireless communication device is retrying establishment of a data connection in accordance with a data retry pattern subsequent to a failed data connection establishment attempt in the first serving network connection state. The program code can further include program code for determining whether the wireless communication device has experienced a failed data connection establishment attempt in the second serving network connection state within a previous period of time. The program code can additionally include program code for continuing to retry data connection establishment in accordance with the data retry pattern in an instance in which the wireless communication device has experienced a failed data connection establishment attempt in the second serving network connection state within the previous period of time. The program code can also include program code for restarting the data retry pattern in an instance in which the wireless communication device has not experienced a failed data connection establishment attempt in the second serving network connection state within the previous period of time.

In an eighth embodiment, an apparatus is provided that can include means for detecting a change in a serving network connection state from a first serving network connection state to a second serving network connection state occurring due to mobility of the wireless communication device while the wireless communication device is retrying establishment of a data connection in accordance with a data retry pattern subsequent to a failed data connection establishment attempt in the first serving network connection state. The apparatus of the eighth embodiment can further include means for determining whether the wireless communication device has experienced a failed data connection establishment attempt in the second serving network connection state within a previous period of time. The apparatus of the eighth embodiment can additionally include means for continuing to retry data connection establishment in accordance with the data retry pattern in an instance in which the wireless communication device has experienced a failed data connection establishment attempt in the second serving network connection state within the previous period of time. The apparatus of the eighth embodiment can also include program code for restarting the data retry pattern in an instance in which the wireless communication device has not experienced a failed data connection establishment attempt in the second serving network connection state within the previous period of time.

In a ninth embodiment, a method for adaptive data connection retry by a wireless communication device is provided. The method of the ninth embodiment can include retrying data connection establishment in accordance with a first data retry pattern having a predefined association with a first application subsequent to a failed attempt by the wireless communication device to establish a data connection for the first application. The method of the ninth embodiment can further include detecting a data request from a second application while retrying data connection establishment in accordance with the first data retry pattern. The method of the ninth embodiment can additionally include determining whether a second priority associated with the second application is greater than a first priority associated with the first application. In an instance in which it is determined that the second priority is not greater than the first priority, the method of the ninth embodiment can also include retrying data connection establishment in accordance with a second data retry pattern having a predefined association with the second application only in an instance in which the wireless communication device is performing a slow retry period when the data request from the second application is detected. In an instance in which it is determined that the second priority is greater than the first priority, the method of the ninth embodiment can further include retrying data connection establishment in accordance with the second data retry pattern.

In a tenth embodiment, a wireless communication device is provided. The wireless communication device of the tenth embodiment can include a transceiver and processing circuitry coupled to the transceiver. The transceiver can be configured to transmit data to and receive data from a wireless network. The processing circuitry can be configured to control the wireless communication device of the tenth embodiment to at least retry data connection establishment in accordance with a first data retry pattern having a predefined association with a first application subsequent to a failed attempt by the wireless communication device to establish a data connection for the first application. The processing circuitry can be further configured to control the wireless communication device of the tenth embodiment to detect a data request from a second application while retrying data connection establishment in accordance with the first data retry pattern. The processing circuitry can be additionally configured to control the wireless communication device of the tenth embodiment to determine whether a second priority associated with the second application is greater than a first priority associated with the first application. The processing circuitry can also be configured, in an instance in which it is determined that the second priority is not greater than the first priority, to control the wireless communication device of the tenth embodiment to retry data connection establishment in accordance with a second data retry pattern having a predefined association with the second application only in an instance in which the wireless communication device is performing a slow retry period when the data request from the second application is detected. The processing circuitry can be additionally configured to control the wireless communication device of the tenth embodiment to retry data connection establishment in accordance with the second data retry pattern in an instance in which it is determined that the second priority is greater than the first priority.

In an eleventh embodiment, a computer program product is provided. The computer program product of the eleventh embodiment can include at least one non-transitory computer readable storage medium having program code stored thereon. The program code can include program code for retrying data connection establishment in accordance with a first data retry pattern having a predefined association with a first application subsequent to a failed attempt by the wireless communication device to establish a data connection for the first application. The program code can further include program code for detecting a data request from a second application while retrying data connection establishment in accordance with the first data retry pattern. The program code can additionally include program code for determining whether a second priority associated with the second application is greater than a first priority associated with the first application. The program code can also include program code for, in an instance in which it is determined that the second priority is not greater than the first priority, retrying data connection establishment in accordance with a second data retry pattern having a predefined association with the second application only in an instance in which the wireless communication device is performing a slow retry period when the data request from the second application is detected. The program code can further include program code for retrying data connection establishment in accordance with the second data retry pattern in an instance in which it is determined that the second priority is greater than the first priority.

In a twelfth embodiment, an apparatus is provided that can include means for retrying data connection establishment in accordance with a first data retry pattern having a predefined association with a first application subsequent to a failed attempt by the wireless communication device to establish a data connection for the first application. The apparatus of the twelfth embodiment can further include means for detecting a data request from a second application while retrying data connection establishment in accordance with the first data retry pattern. The apparatus of the twelfth embodiment can additionally include means for determining whether a second priority associated with the second application is greater than a first priority associated with the first application. The apparatus of the twelfth embodiment can also include means for, in an instance in which it is determined that the second priority is not greater than the first priority, retrying data connection establishment in accordance with a second data retry pattern having a predefined association with the second application only in an instance in which the wireless communication device is performing a slow retry period when the data request from the second application is detected. The apparatus of the twelfth embodiment can further include means for retrying data connection establishment in accordance with the second data retry pattern in an instance in which it is determined that the second priority is greater than the first priority.

The above summary is provided merely for purposes of summarizing some example embodiments of the invention so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of the disclosure will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
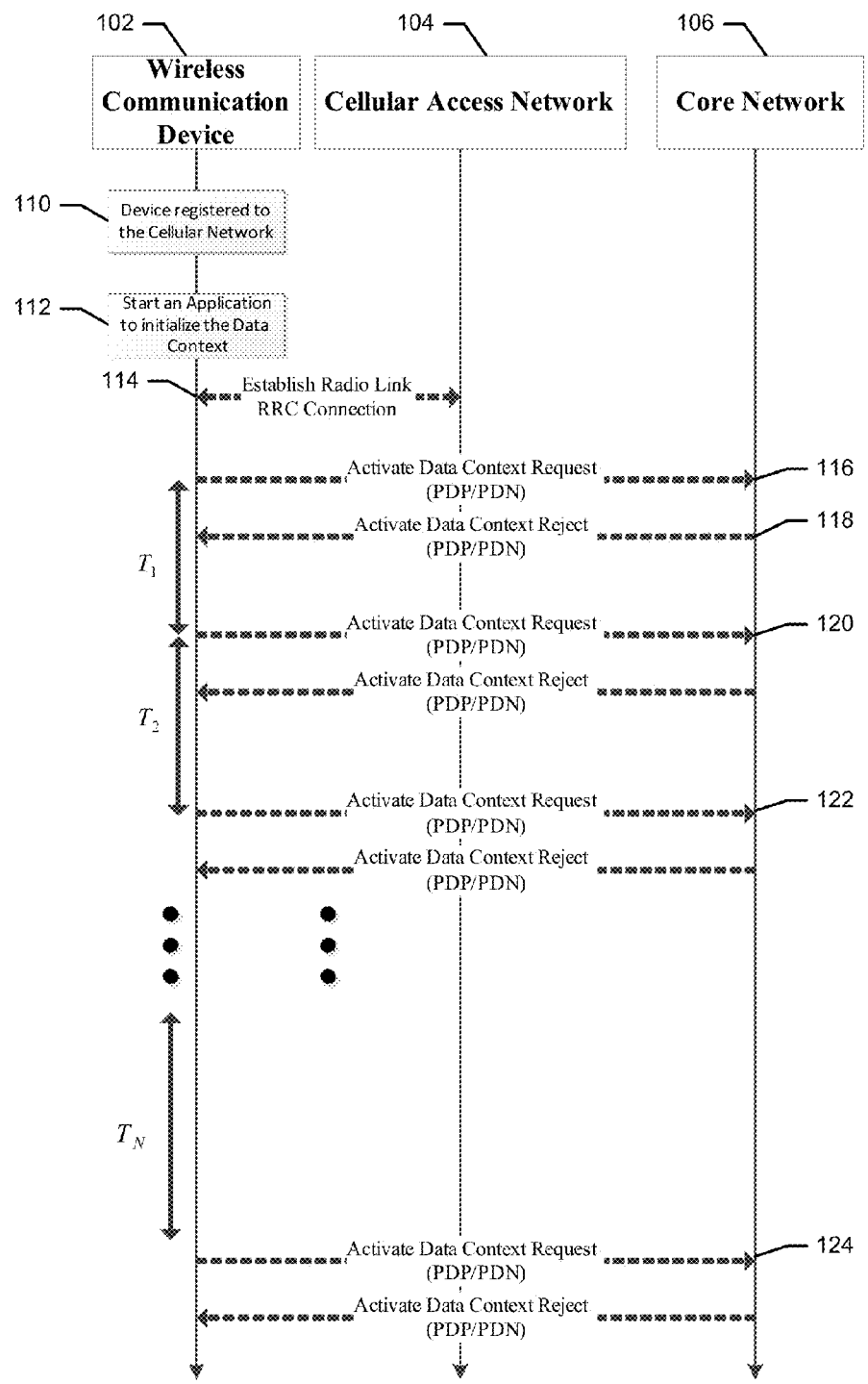
FIG. 1 illustrates a signaling diagram of messages that can be exchanged between a wireless communication device and a network while applying a data retry pattern following a data connection establishment failure in accordance with some example embodiments.

Representative applications of the methods and apparatus disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for adaptive data connection retry by a wireless communication device. Such example embodiments can provide a holistic approach to adapt data retry patterns based on characteristics of the requesting application. In this regard, factors such as application profile, network profile, application status, device context, user activity, location information, recently visited networks, and/or other information can be factored into selecting an appropriate data retry pattern. More particularly, in accordance with some example embodiments, a wireless communication device can apply a data retry pattern having a predefined association with an application when retrying data connection establishment subsequent to a failed attempt to establish a data connection for the application. In this regard, a wireless communication device in accordance with some example embodiments can be provisioned with a set of predefined data retry patterns that can be defined based at least in part on application usage data that can be collected by a network entity from a plurality of wireless communication devices. Accordingly, application-specific data retry patterns can be used in some example embodiments so that an aggressiveness of a data retry pattern applied following a failed data connection attempt can be appropriate to a particular application's usage characteristics so as to provide a good user experience by reducing data stall time through application of a more aggressive data retry pattern where appropriate without unnecessarily burdening a serving network through potentially excessive signaling or unnecessarily draining device power in instances in which of a highly aggressive data retry pattern is not appropriate.

Some example embodiments disclosed herein provide for adaptive data connection retry in the event that a wireless communication device transitions from a first serving network connection state to a second network connection state due to mobility of the wireless communication device while the wireless communication device is retrying establishment of a data connection in accordance with a data retry pattern subsequent to a failed data connection establishment attempt in the first serving network connection state. More particularly, a wireless communication device in accordance with some such example embodiments can be configured to maintain a record of data connection establishment attempt failures experienced by the wireless communication device in respective serving network connection states. If the wireless communication device transitions to a new serving network connection state in which the wireless communication device has previously experienced a failed data connection attempt while performing a data retry pattern, the device can continue the existing data retry pattern. If, however, the wireless communication device transitions to a new serving network connection state in which the wireless communication device has not previously experienced a failed data connection attempt while performing a data retry pattern, the device can restart the data retry pattern to be more aggressive in attempting to establish the data connection in the new network connection state.

Some example embodiments provide for adaptive data connection retry in situations in which multiple applications have requested data resources. More particularly, a wireless communication device provided by some such example embodiments can be configured to select an appropriate data retry pattern to apply based on respective priorities of the applications needing a data connection. Thus, for example, in some such example embodiments, a data retry pattern having an association with the highest priority application can be selected such that the data retry pattern used following a failed connection attempt can be appropriately aggressive for the highest priority application requesting a data connection.

FIG. 1 illustrates a signaling diagram of messages that can be exchanged between a wireless communication device and a network while applying a data retry pattern following a data connection establishment failure in accordance with some example embodiments. The example of FIG. 1 illustrates Non-Access Stratum (NAS) signaling between the wireless communication device 102 and core network 106 in accordance with Third Generation Partnership Project (3GPP) data retry cases, including packet data protocol (PDP) rejects for GPRS/EDGE/UMTS/HSPA networks and service/pack data network (PDN) connectivity rejects for Long Term Evolution (LTE) and beyond cellular networks. As illustrated by operation 110, a wireless communication device 102 can be registered to a cellular network. At operation 112, an application can be started on the wireless communication device 102. The application can need a data connection and a data context can be initialized. At operation 114, the wireless communication device 102 and a cellular access network 104 can establish a radio link, such as a radio resource control (RRC) connection. The wireless communication device 102 can send a request to activate a data context to the core network 106 in an attempt to establish a data connection for the application, at operation 116. The core network 106 can reject the data context activation request, at operation 118. In response to the failed attempt to establish a data connection, the wireless communication device 102 can retry establishing the data connection in accordance with a data retry pattern, such as that described with respect to FIG. 2. The data retry pattern can define a number, N, of retry attempts and respective time intervals between retry attempts. In some data retry patterns, the wireless communication device 102 can continue to retry to establish a data connection if a data connection has not been successfully established after N attempts, using an interval $T_N$, which was used between attempt N−1 and attempt N, between respective retry attempts until a data connection is successfully established, such as via the cellular network, Wi-Fi, or other wireless radio access technology.

Figure 2:
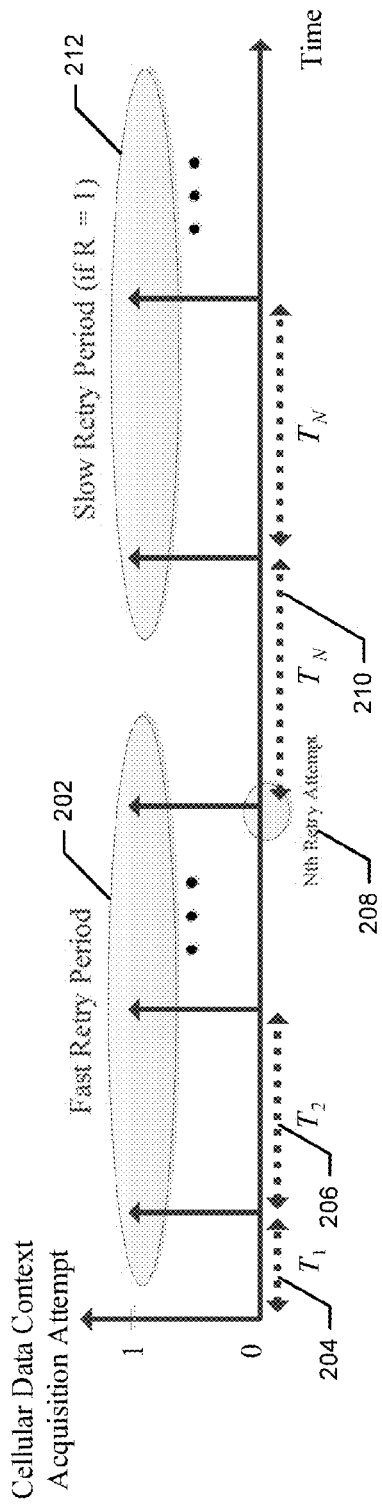
FIG. 2 illustrates an example data retry pattern in accordance with some example embodiments.

FIG. 2 illustrates an example data retry pattern in accordance with some example embodiments. The example data retry pattern of FIG. 2 can, for example, be the data retry pattern applied in the example of FIG. 1. The data retry pattern of FIG. 2 can include a fast retry period 202, which can include up to N data connection retry attempts separated by the respective time intervals, T1 204, T2 206, ... $T_N$. The time interval between each retry attempt in the fast retry period 202 can be represented by the array [T1, T2 ... $T_N$]. As such, the wireless communication device 102 can wait for the interval $T_1$ 204 before making the first retry attempt, at operation 120. If the first retry attempt of operation 120 fails, as illustrated in the example of FIG. 1, the wireless communication device 102 can wait for the interval $T_2$ 206 before making a second retry attempt, at operation 122. If a data connection is not successfully established, retry attempts can continue, with the wireless communication device 102 waiting for a time interval $T_N$ between an N−1$^{st}$ retry attempt and an N$^{th}$ retry attempt at operation 124. Some data retry patterns can use a back-off algorithm where the interval $T_i$ can be greater than $T_j$ for all retry attempt intervals i>j.

A data retry pattern in accordance with some example embodiments can optionally include a slow retry period 212. In some example embodiments, a data retry pattern can include a Boolean or other variable, which can be referred to as "R," that can have a value indicating whether the data retry pattern include a slow retry period (e.g., R=1 if the data retry pattern has a slow retry period, or R=0 if the data retry pattern does not have a slow retry period). If the data retry pattern includes a slow retry period, as illustrated in the example of FIG. 2, retry attempts can continue infinitely following the N$^{th}$ retry attempt 208 (e.g., following operation 124 of FIG. 1) with the interval $T_N$ 210 being repeated between each retry attempt until a data connection is successfully established.

Figure 3:
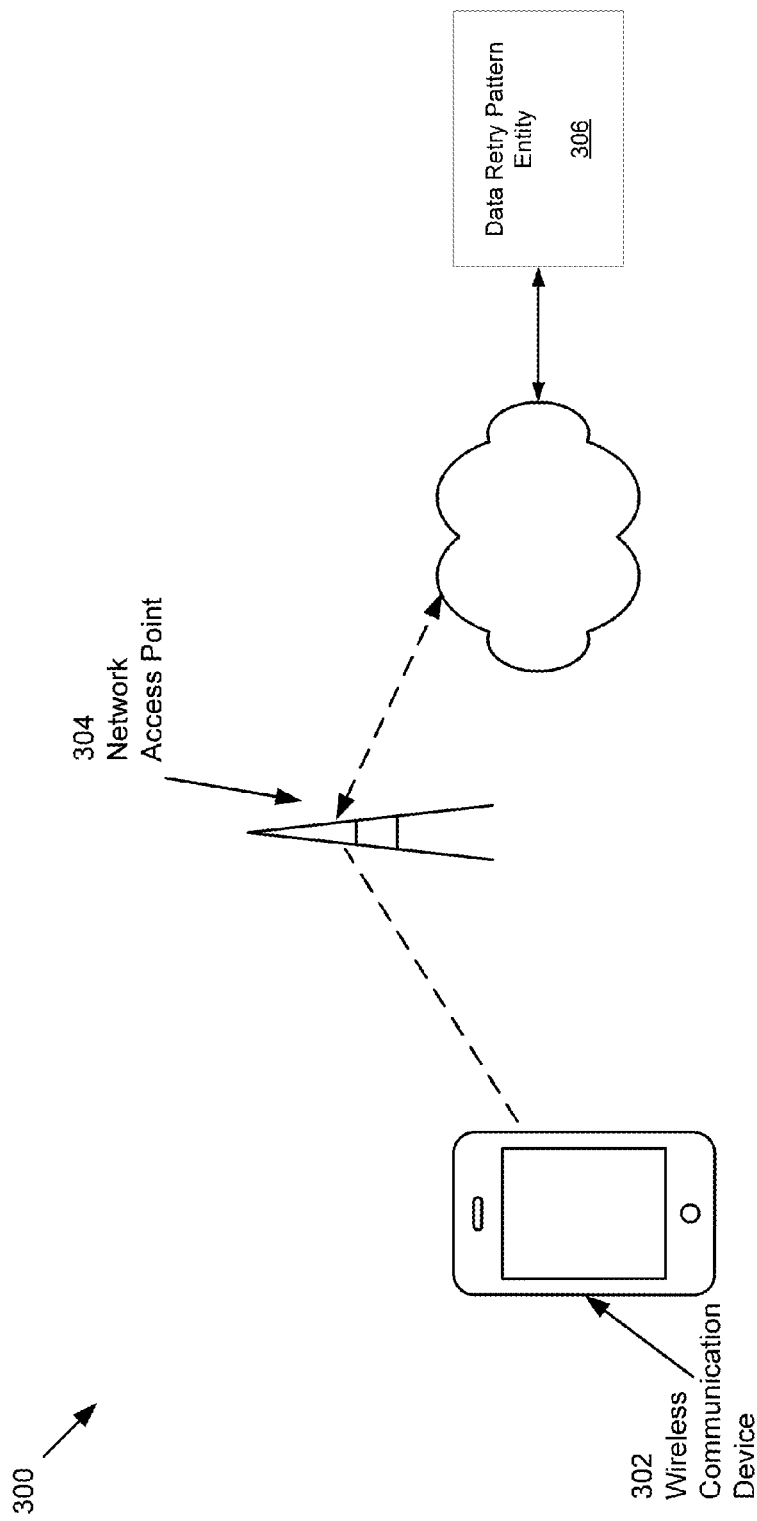
FIG. 3 illustrates a wireless communication system in accordance with some example embodiments.

FIG. 3 illustrates a wireless communication system 300 in accordance with some example embodiments. The system 300 can include one or more wireless communication devices 302. By way of non-limiting example, a wireless communication device 302 can be a cellular phone, such as a smart phone device, a tablet computing device, a laptop computing device, or other computing device configured to wirelessly access a network via a network access point 304 and operate within a wireless network. In some example embodiments, such as those in which the system 300 includes an LTE network, the wireless communication device 302 can be referred to as user equipment (UE).

A network access point 304 can comprise any entity serving as an access point for a wireless network. For example, in some embodiments, the network access point 304 can include a cellular base station, such as a base transceiver station, node B, evolved node B (eNB), and/or other base station configured to provide access to a cellular network. In embodiments in which the network access point 304 includes a cellular base station, the network access point 304 can be configured to implement any cellular radio access technology (RAT), such as, by way of example, one or more fourth generation (4G) RATs, such as LTE, LTE-Advanced, and/or other present or future developed 4G RAT; one or more third generation (3G) RATs, such as a Wideband Code Division Multiple Access (WCDMA) or other Universal Mobile Telecommunications System (UMTS) RAT, such as a Time Division Synchronous Code Division Multiple Access (TD-SCDMA) RAT, a CDMA2000 RAT, and/or other 3G RAT; one or more 2G RATs, such as a Global System for Mobile Communications (GSM) RAT; and/or one or more further present or future developed cellular RATs. As further examples, in some embodiments, the network access point 304 can provide an access point for a wireless local area network (WLAN), a wireless metropolitan area network (WMAN), wireless personal area network, and/or other non-cellular wireless RAT.

In some example embodiments, the system 300 can further include a data retry pattern entity 306. The data retry pattern entity 306 can, for example, be embodied as a one or more servers, a cloud computing infrastructure, or other computing entity. As will be described further herein below, the data retry pattern entity 306 can be a network entity that in some example embodiments can be configured to collect application usage data from a plurality of wireless communication devices (e.g., wireless communication devices 302) and use the collected application usage data to define data retry patterns specific to particular applications and/or categories of applications. As such, in some example embodiments, the wireless communication device 302 can be configured to send application usage data to the data retry pattern entity 306 via the network access point 304. Further, in some example embodiments, the data retry pattern entity 306 can be configured to provision data retry patterns to the wireless communication device 302.

Figure 4:
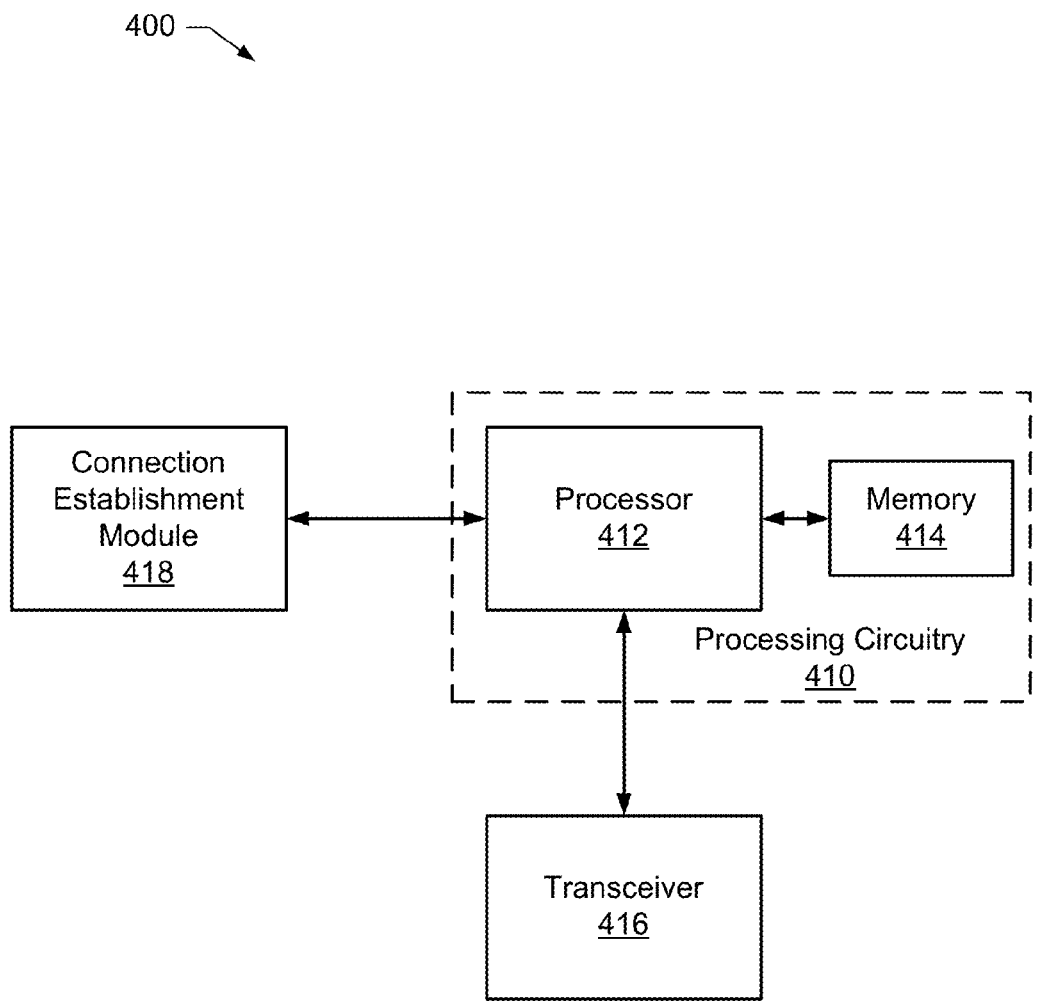
FIG. 4 illustrates a block diagram of an apparatus that can be implemented on a wireless communication device in accordance with some example embodiments.

FIG. 4 illustrates a block diagram of an apparatus 400 that can be implemented on a wireless communication device 302 in accordance with some example embodiments. In this regard, when implemented on a computing device, such as wireless communication device 302, apparatus 400 can enable the computing device to operate within the system 300 in accordance with one or more example embodiments. It will be appreciated that the components, devices or elements illustrated in and described with respect to FIG. 4 below may not be mandatory and thus some may be omitted in certain embodiments. Additionally, some embodiments can include further or different components, devices or elements beyond those illustrated in and described with respect to FIG. 4.

Figure 5:
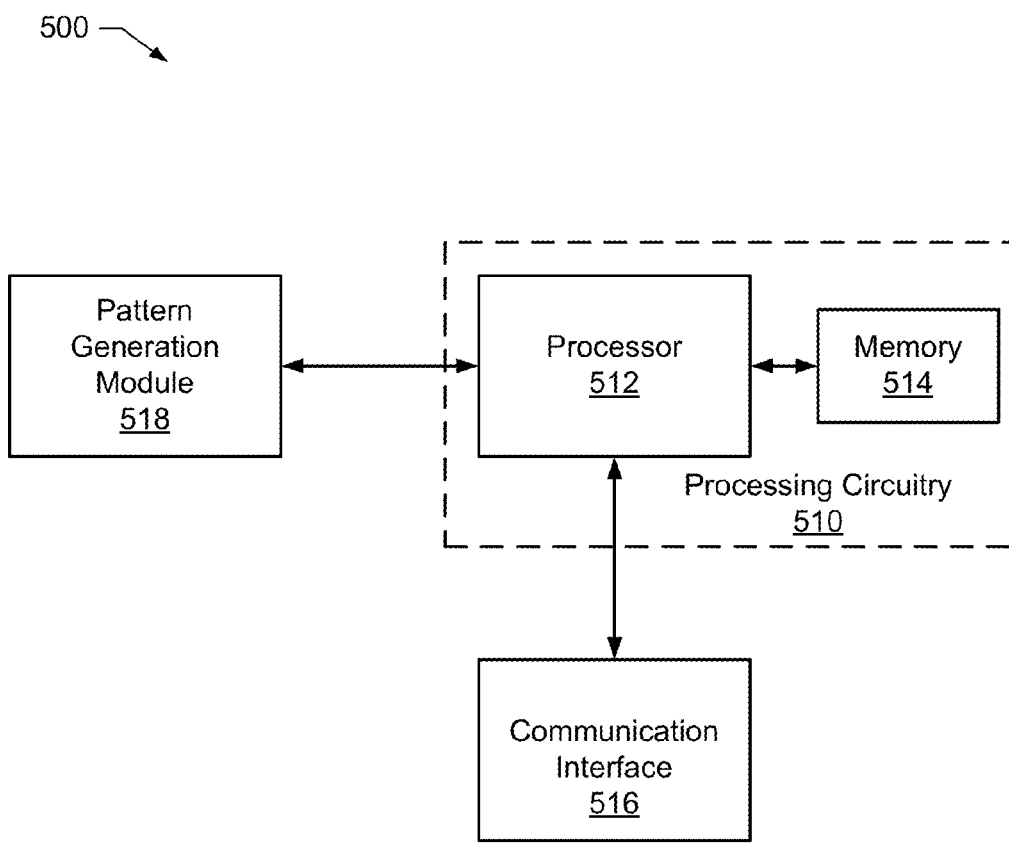
FIG. 5 illustrates a block diagram of an apparatus that can be implemented on a data retry pattern entity in accordance with some example embodiments.

FIG. 5 illustrates a block diagram of an apparatus 500 that can be implemented on a data retry pattern entity 306 in accordance with some example embodiments. It will be appreciated that the components, devices or elements illustrated in and described with respect to FIG. 5 below may not be mandatory and thus some may be omitted in certain embodiments. Additionally, some embodiments can include further or different components, devices or elements beyond those illustrated in and described with respect to FIG. 5.

In some example embodiments, the data retry pattern entity 306 can include processing circuitry 510 that is configurable to perform actions in accordance with one or more example embodiments disclosed herein. In this regard, the processing circuitry 510 can be configured to perform and/or control performance of one or more functionalities of the data retry pattern entity 306 in accordance with various example embodiments, and thus can provide means for performing functionalities of the data retry pattern entity 306 in accordance with various example embodiments. The processing circuitry 510 can be configured to perform data processing, application execution and/or other processing and management services according to one or more example embodiments.

In some embodiments, the data retry pattern entity 306 or a portion(s) or component(s) thereof, such as the processing circuitry 510, can include one or more chipsets, which can each include one or more chips. The processing circuitry 510 and/or one or more further components of the data retry pattern entity 306 can therefore, in some instances, be configured to implement an embodiment on a single chip or chipset.

In some example embodiments, the processing circuitry 510 can include a processor 512 and, in some embodiments, such as that illustrated in FIG. 5, can further include memory 514. The processing circuitry 510 can be in communication with or otherwise control a communication interface 516 and/or pattern generation module 518.

The processor 512 can be embodied in a variety of forms. For example, the processor 512 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 can comprise a plurality of processors. The plurality of processors can be in operative communication with each other and can be collectively configured to perform one or more functionalities of the data retry pattern entity 306 as described herein. In embodiments including a plurality of processors, the processors can be implemented on a single computing device, or can be distributed across a plurality of computing devices that can be collectively configured to provide functionality of the data retry pattern entity 306 in accordance with some example embodiments. In some example embodiments, the processor 512 can be configured to execute instructions that can be stored in the memory 514 or that can be otherwise accessible to the processor 512. As such, whether configured by hardware or by a combination of hardware and software, the processor 512 capable of performing operations according to various embodiments while configured accordingly.

In some example embodiments, the memory 514 can include one or more memory devices. In embodiments including multiple memory devices, the memory devices can be implemented on a single computing device, or can be distributed across a plurality of computing devices that can be collectively configured to provide functionality of the data retry pattern entity 306 in accordance with some example embodiments. Memory 514 can include fixed and/or removable memory devices. In some embodiments, the memory 514 can provide a non-transitory computer-readable storage medium that can store computer program instructions that can be executed by the processor 512. In this regard, the memory 514 can be configured to store information, data, applications, instructions and/or the like for enabling the data retry pattern entity 306 to carry out various functions in accordance with one or more example embodiments. In some embodiments, the memory 514 can be in communication with one or more of the processor 512, communication interface 516, or pattern generation module 518 via a bus(es) for passing information among components of the data retry pattern entity 306.

The data retry pattern entity 306 can further include a communication interface 516. The communication interface 516 can enable the data retry pattern entity 306 to communicate with one or more wireless communication devices 302. In this regard, the communication interface 516 can include one or more interface mechanisms for enabling communication with other devices and/or networks. As such, the communication interface 218 can include, for example, an antenna (or multiple antennas) and supporting hardware and/or software for enabling communications with a wireless communication network (e.g., a cellular network, WSN, and/or the like) and/or a communication modem or other hardware/software for supporting communication via cable, digital subscriber line (DSL), universal serial bus (USB), Ethernet or other wireline networking methods.

The data retry pattern entity 306 can further include pattern generation module 518. The pattern generation module 518 can be embodied as various means, such as circuitry, hardware, a computer program product comprising computer readable program instructions stored on a computer readable medium (for example, the memory 514) and executed by a processing device (for example, the processor 512), or some combination thereof. In some embodiments, the processor 512 (or the processing circuitry 510) can include, or otherwise control the pattern generation module 518.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the apparatus 400 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a single chip or chipset. In some example embodiments in which one or more components of the apparatus 400 are embodied as a chipset, the chipset can be capable of enabling a computing device to operate in the system 300 when implemented on or otherwise operably coupled to the computing device. Thus, for example, one or more components of the apparatus 400 can provide a chipset configured to enable a computing device to connect to a wireless network via a network access point 304 and operate on the wireless network.

In some example embodiments, the processing circuitry 410 can include a processor 412 and, in some embodiments, such as that illustrated in FIG. 4, can further include memory 414. The processing circuitry 410 can be in communication with or otherwise control a transceiver 416 and/or connection establishment module 418.

The processor 412 can be embodied in a variety of forms. For example, the processor 412 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 412 can comprise a plurality of processors. The plurality of processors can be in operative communication with each other and can be collectively configured to perform one or more functionalities of the apparatus 400 as described herein. In some example embodiments, the processor 412 can be configured to execute instructions that can be stored in the memory 414 or that can be otherwise accessible to the processor 412. As such, whether configured by hardware or by a combination of hardware and software, the processor 412 capable of performing operations according to various embodiments while configured accordingly.

In some example embodiments, the memory 414 can include one or more memory devices. Memory 414 can include fixed and/or removable memory devices. In some embodiments, the memory 414 can provide a non-transitory computer-readable storage medium that can store computer program instructions that can be executed by the processor 412. In this regard, the memory 414 can be configured to store information, data, applications, instructions and/or the like for enabling the apparatus 400 to carry out various functions in accordance with one or more example embodiments. In some embodiments, the memory 414 can be in communication with one or more of the processor 412, transceiver 416, or connection establishment module 418 via a bus(es) for passing information among components of the apparatus 400.

The apparatus 400 can further include transceiver 416. The transceiver 416 can enable the apparatus 400 to send wireless signals to and receive signals from one or more wireless networks. As such, the transceiver 416 can be configured to support any type of cellular and/or other wireless RAT technology that may be implemented by a network access point 304.

The apparatus 400 can further include connection establishment module 418. The connection establishment module 418 can be embodied as various means, such as circuitry, hardware, a computer program product comprising computer readable program instructions stored on a computer readable medium (for example, the memory 414) and executed by a processing device (for example, the processor 412), or some combination thereof. In some embodiments, the processor 412 (or the processing circuitry 410) can include, or otherwise control the connection establishment module 418.

Figure 6:
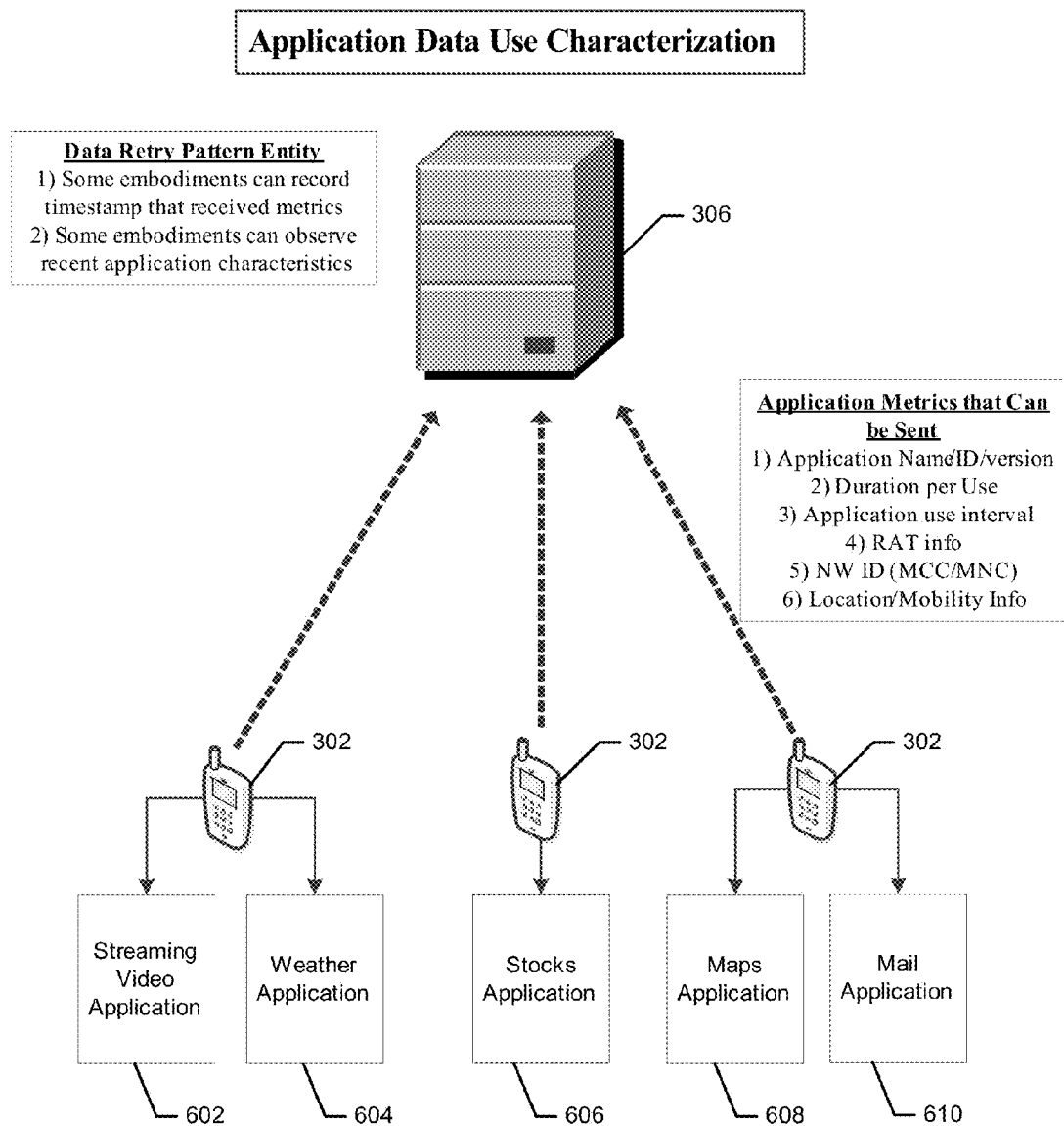
FIG. 6 illustrates generation of data retry patterns based on collected application usage data in accordance with some example embodiments.

FIG. 6 illustrates generation of data retry patterns based on collected application usage data in accordance with some example embodiments. In such embodiments, the pattern generation module 518 can be configured to collect application usage data from a plurality of wireless communication devices 302. A wireless communication device 302 in accordance with such embodiments can be configured to provide a variety of metrics related to application usage to the data retry pattern entity 306. For example, usage data indicative of a duration per use of an application, a frequency of use of an application (e.g., a number of times the application is used per day), a RAT on which the application is used, a network identifier (e.g., a mobile country code, mobile network code, and/or other network identifier) of a network that the device was connected to when the application is used, a location at which the application is used, a mobility state and/or other device context at the time at which the application is used, and/or other application usage data can be provided to the data retry pattern entity 306 by a wireless communication device 302.

Application usage data can be provided to the data retry pattern entity 306 in association with an indication of the associated application's identity, such as a name of the application, an application ID, a version or other release information for the application, and/or other information that can be used by the pattern generation module 518 to identify an application with which received usage data is associated and to aggregate data usage received from multiple wireless communication devices 302 by application and/or application category. As illustrated in FIG. 6, application usage data can be collected for any of a variety of applications. For example, application usage data can be collected from a streaming video application 602, weather application 604, stocks application 606, maps application 608, mail application 610, and/or other application that can be implemented on a wireless communication device 302.

The pattern generation module 518 can be configured to use collected application usage data to track usage characteristics of applications. The pattern generation module 518 can be configured to categorize applications based on their respective usage characteristics. In some embodiments, multiple applications can be grouped into a single category. By way of non-limiting example, the pattern generation module 518 of some example embodiments can be configured to categorize applications based at least in part on their usage popularity (e.g., average duration of use, frequency of use, and/or the like), required quality of service, usage character (e.g., persistent/non-persistent), application character (e.g., native/non-native, trusted/non-trusted, and/or the like), and/or other factors. A persistent application can be an application needing a substantially constant data connection to function. As an example, an email application can be a persistent application. A non-persistent application can be an application that does not need a substantially constant data connection to function. For example, a web browsing application may only need an active data context when performing a page retrieval. A trusted application can be an application that is natively installed on a wireless communication device 302, whereas a non-trusted application can be a non-native application later installed on the device by a device user. As another example, a trusted application can be an application known to be distributed by a reputable software maker and/or known to not have a history of negatively impacting device functionality. Similarly, a non-trusted application can be an application known to be distributed by a disreputable or otherwise unknown software maker and/or that is known to be associated with dissemination of viruses, malware, and/or otherwise known to negatively impact device functionality.

The pattern generation module 518 can be further configured to define distinct data retry patterns for each application, application category, and/or application subcategory. The defined data retry patterns can be stored (e.g., in memory 514) as a profile comprised of a set of data retry patterns. Each data retry pattern in a set of data retry patterns can have a predefined association with an application, such as a direct association with a specific application and/or an indirect association by way of an association with an application category/subcategory.

In some example embodiments, a more aggressive data retry pattern can be defined for a trusted/native application than for a non-trusted/non-native application. Similarly, in some example embodiments, a more aggressive data retry pattern can be defined for a persistent application than for a non-persistent application.

In some example embodiments, the pattern generation module 518 can use a network identifier (NW-ID), such as a mobile country code (MCC) and mobile network code (MNC) pairing, associated with received application usage data to observe the different usage behavior and popularity of the same application in different networks. For instance, a stock application can be more popular in some countries with respect to others. In such embodiments, the pattern generation module 518 can be configured to generate multiple profiles comprised of respective sets of data retry patterns with each profile being specific to a particular geographic region, such as to a particular network coverage area, a particular country, and/or other geographic region. As such, the same application running in different networks may have different associated data retry patterns defined by the pattern generation module 518 depending on the varying popularity of the specific application.

In some example embodiments, a set of data retry patterns can be specific to a particular NW-ID (e.g., MCC-MNC pair) and/or a RAT(s) to make sure that a wireless communication device 302 using the set of data retry patterns does not violate a carrier defined retry mechanism(s) on various radio technologies.

A data retry pattern in accordance with some example embodiments can include an array, such as [T1, T2 . . . TN], or other data structure defining intervals between data retry attempts. The number N of attempts during the fast retry period can vary across different applications/application categories. Higher priority applications, such as persistent applications, applications that are more frequently used, and/or other qualities that can be used to categorize applications for which it can be more urgent to establish a data connection can be configured with higher N values so that the data retry pattern is more aggressive.

A data retry pattern can further include an indicator R, such as the Boolean R ∈ [0,1] indicating whether the data retry pattern has a slow retry period if a data connection has not been established following the first N attempts in the fast retry period. Thus, for example, if R=1 a wireless communication device can continue to try to establish a data connection until successful with each attempt during the slow retry period being TN apart. If, however, R=0, the device can stop performing retry attempts after N attempts. Thus, a data retry pattern that can be defined by the pattern generation module 518 can be similar to that discussed with respect to FIG. 2. Data retry patterns for persistent applications, like email can be configured with a slow retry period. However, data retry patterns defined for applications classified as non-persistent applications, such as multimedia messaging service (MMS) applications or other applications that require only short term data use may not include a slow retry period.

In some example embodiments in which the pattern generation module 518 is configured to categorize multiple applications into a single category, a category can include subcategories that can be used by a wireless communication device 302 to select an appropriate data retry pattern based on device context. For example, the data retry pattern can be adapted according to user specific conditions, such as a device mobility state (e.g., Static, Pedestrian, Vehicular, Extended-Vehicular, and/or other mobility state), a time of day at which a data request is made, current user activity (e.g., Screen On/Off State, Keypad/Touch screen Events, and/or the like), and/or other context conditions that can be detected and measured by a wireless communication device 302 of some example embodiments. Such subcategories can accordingly be used to further refine the aggressiveness of a data retry pattern in accordance with a device/user context at a time at which the application makes a data request. For example, if a stock application makes a data request when a device is in a vehicular mobility state, a less aggressive data retry pattern can be used because the user can be less likely to actively use the stock application when driving. However, if a maps application makes a data request when a device is in a vehicular mobility state, a more aggressive data retry pattern can be used because the maps application may be used for navigation in such a mobility state. As another example, subcategories can be defined based on a RAT in use by the wireless communication device 302. For example, some applications might usually be used on a Wi-Fi connection rather than on a cellular connection and a less aggressive data retry pattern may be defined for instances in which the application requests data when the device is using cellular connectivity.

Data retry patterns of subcategories can be characterized by respective retry coefficients, as shown below Table 1, which illustrates an example categorized adaptive data retry pattern profile. The product of the retry coefficient of a subcategory and the default retry pattern intervals for a category can be used adjust the aggressiveness level of the retry mechanism based on device context. For example, if the device is in a vehicular mobility state the screen is off, the retry coefficient can be set to a higher value compared to a user in static condition with screen on.

TABLE 1

Example Categorized Application Adaptive Data Retry Pattern Table

| Application Category | RAT Choice | NW/ID MCC/MNC | Mobility Condition | User Activity | Time | Data Retry Pattern | Offset Time Retry Coefficient |
|---|---|---|---|---|---|---|---|
| Cat-1 (Persistent & Trusted) | LTE | MCC1-MNC1 | Static | Screen On | Daytime | $T_1, T_2, \ldots, T_N$ [R = 1] | [60, 1] |

TABLE 1-continued

Example Categorized Application Adaptive Data Retry Pattern Table

| Application Category | RAT Choice | NW/ID MCC/MNC | Mobility Condition | User Activity | Time | Data Retry Pattern | Offset Time Retry Coefficient |
|---|---|---|---|---|---|---|---|
| Sub-cat 1.1 | LTE | MCC1-MNC1 | Pedestrian | Screen On | Daytime | $1.2T_1, \ldots, 1.2T_N$ | [60, 1.2] |
| Sub-cat 1.2 | LTE | MCC1-MNC1 | Vehicular | Screen On | Daytime | $1.5T_1, \ldots, 1.5T_N$ | [60, 1.5] |
| . | | | | | | | |
| . | | | | | | | |
| Cat-N (Non-Persistent & Non-Trusted) | LTE | MCC1-MNC1 | Static | Screen On | Daytime | $T_1, T_2, \ldots, T_N$ [R = 0] | [60, 1] |

A wireless communication device 302 can be provisioned with a set of data retry patterns during a build phase by a device manufacturer, operating system distributor, and/or the like. For example, a set of data retry patterns, each of which can have a predefined association with an application, can be provisioned to a wireless communication device 302 as part of an operating system and/or software build process.

Additionally or alternatively, in some example embodiments, a wireless communication device 302 can be provisioned with a new set of data retry patterns in response to a change in location. For example, in some embodiments, when a wireless communication device 302 moves to a new network/geographic region, such as when roaming, the wireless communication device 302 can be provisioned with a set of data retry patterns specific to that geographic region. In such embodiments, the wireless communication device 302 can, for example, request a location-specific set of data retry patterns in response to moving to a new network/geographic region. Additionally or alternatively, in some embodiments, a location-specific set of data retry patterns can be pushed automatically to the wireless communication device 302 by the data retry entity 306 in response to the wireless communication device 302 moving to a new network/geographic region. Thus, for example, a user can primarily use a wireless communication device 302 in the United States and the device can be provisioned with a set of data retry patterns defined for use in the United States. The user can then visit China, and the device can be provisioned with a second set of data retry patterns defined for use in China that may be used by the device when operating in China.

As the data retry pattern entity 306 can continue to collect application usage data on an ongoing basis, data retry patterns can be updated based on more recent usage data received by the data retry pattern entity 306. As such, in some embodiments, a wireless communication device 302 can be provisioned with an updated set of data retry patterns by the data retry pattern entity 306. Provisioning of updated data retry patterns to a wireless communication device 302 can, for example, occur on a scheduled periodic basis, in response to updating of a data retry pattern by the data retry pattern entity 306, in response to a request from a wireless communication device 302, and/or the like.

A set of data retry patterns can include a default data retry pattern in some example embodiments. In such embodiments, the default retry mechanism can be used by a wireless communication device 302 for an application for which the data retry pattern entity 306 has not yet gathered a sufficient amount of usage data to define a data retry pattern for the application. After sufficient usage data has been collected to enable the data retry pattern entity 306 to characterize an application and define an appropriate data retry pattern, such data retry pattern can be provisioned to a wireless communication device 302 for use with that application.

Figure 7:
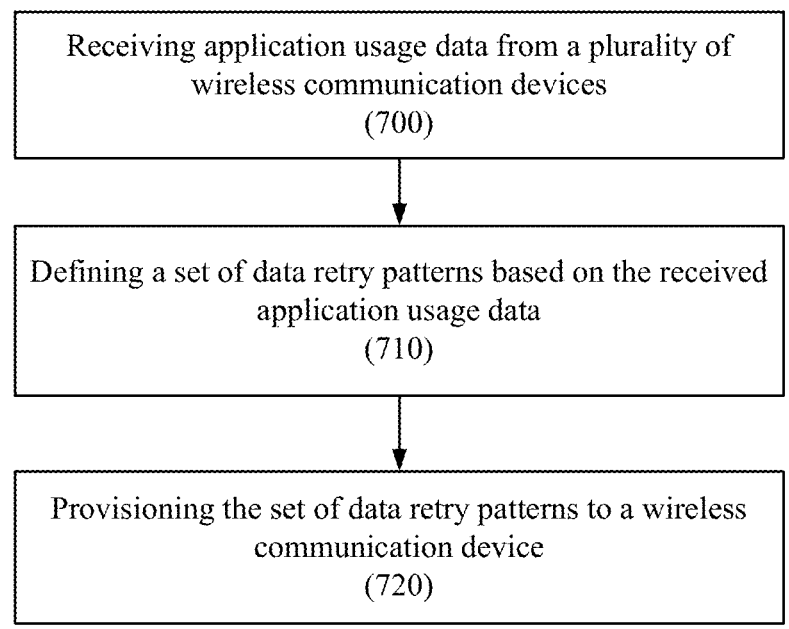
FIG. 7 illustrates a flowchart according to an example method for defining and provisioning a set of data retry patterns according to some example embodiments.

FIG. 7 illustrates a flowchart according to an example method for defining and provisioning a set of data retry patterns according to some example embodiments. In this regard, FIG. 7 illustrates operations that can be performed by a data retry pattern entity 306 in accordance with some example embodiments. One or more of processing circuitry 510, processor 512, memory 514, communication interface 516, or pattern generation module 518 can, for example, provide means for performing the operations illustrated in and described with respect to FIG. 7. Operation 700 can include the data retry pattern entity 306 receiving application usage data from a plurality of wireless communication devices. Operation 710 can include the data retry pattern entity 306 defining (e.g., generating and/or updating) a set of data retry patterns based on the received application usage data. Operation 720 can include the data retry pattern entity 306 provisioning the set of data retry patterns to a wireless communication device 302.

Figure 8:
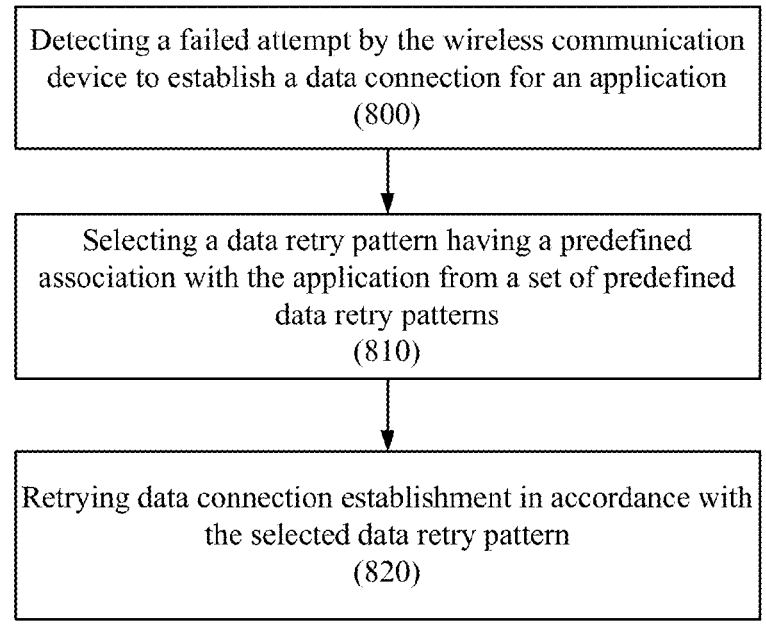
FIG. 8 illustrates a flowchart according to an example method for adaptive data connection retry by a wireless communication device according to some example embodiments.

FIG. 8 illustrates a flowchart according to an example method for adaptive data connection retry by a wireless communication device according to some example embodiments. One or more of processing circuitry 410, processor 412, memory 414, transceiver 416, or connection establishment module 418 can, for example, provide means for performing the operations illustrated in and described with respect to FIG. 8. Operation 800 can include detecting a failed attempt by the wireless communication device 302 to establish a data connection for an application. For example, the wireless communication device 302 can receive a data context rejection from a core network. Operation 810 can include the connection establishment module 418 selecting a data retry pattern having a predefined association with the application from a set of predefined data retry patterns that have been provisioned to the wireless communication device 302. In this regard, the connection establishment module 418 can select a data retry pattern defined for the application and/or that has been defined for a category into which the application falls. In some example embodiments, the selected data retry pattern can be selected based at least in part on a context of the wireless communication device 302. For example, factors such as a mobility state of the device, a location of the device, a Rat to which the device can be connected, a state of usage of the device, and/or other such context factors can be used to select an appropriate data retry pattern. Thus, for example, if the set of data retry patterns used by the wireless communication device 302 includes subcategories as in the example of Table 1, context factors can be used to select an appropriate subcategory and corresponding data retry pattern for the application. Operation 820 can include the wireless communication device 302 retrying data connection establishment in accordance with the selected data retry pattern.

In some instances, multiple applications running on a wireless communication device 302 can request data. The connection establishment module 418 of some example embodiments can be configured to determine respective priorities of the requesting applications in such instances to determine an appropriate data retry pattern to apply. In this regard, a data retry pattern having a predefined association with the higher priority application can be selected over a data retry pattern having a predefined association with the lower priority application. For example, one requesting application may be running in the foreground and may be in active use by a user of the wireless communication device 302, while a second requesting application may be a background application. In this example, the connection establishment module 418 can be configured in some example embodiments to select a data retry pattern having a predefined association with the application running in the foreground rather than the application running in the background.

Some example embodiments provide for adaptive data retry in an instance in which a serving network connection state changes while a wireless communication device 302 is retrying establishment of a data connection following a failed attempt to establish a data connection. A serving network connection state change can, for example, include the wireless communication device 302 changing serving networks from a first network to a second network, changing RATs from a first RAT to a second RAT, changing routing areas from a first routing area identifier (RAI) to a second RAI, changing location areas from a first location area identity (LAI) to a second LAI, and/or other change in a serving network connection state. The connection establishment module 418 can be configured in such example embodiments to detect a change in a serving network connection state based on an identifier that can be indicative of a serving network connection state, such as an MCC, MNC, LAI, RAI, a network access point identifier, and/or other identifier that can be indicative of the serving network connection state.

Figure 9:
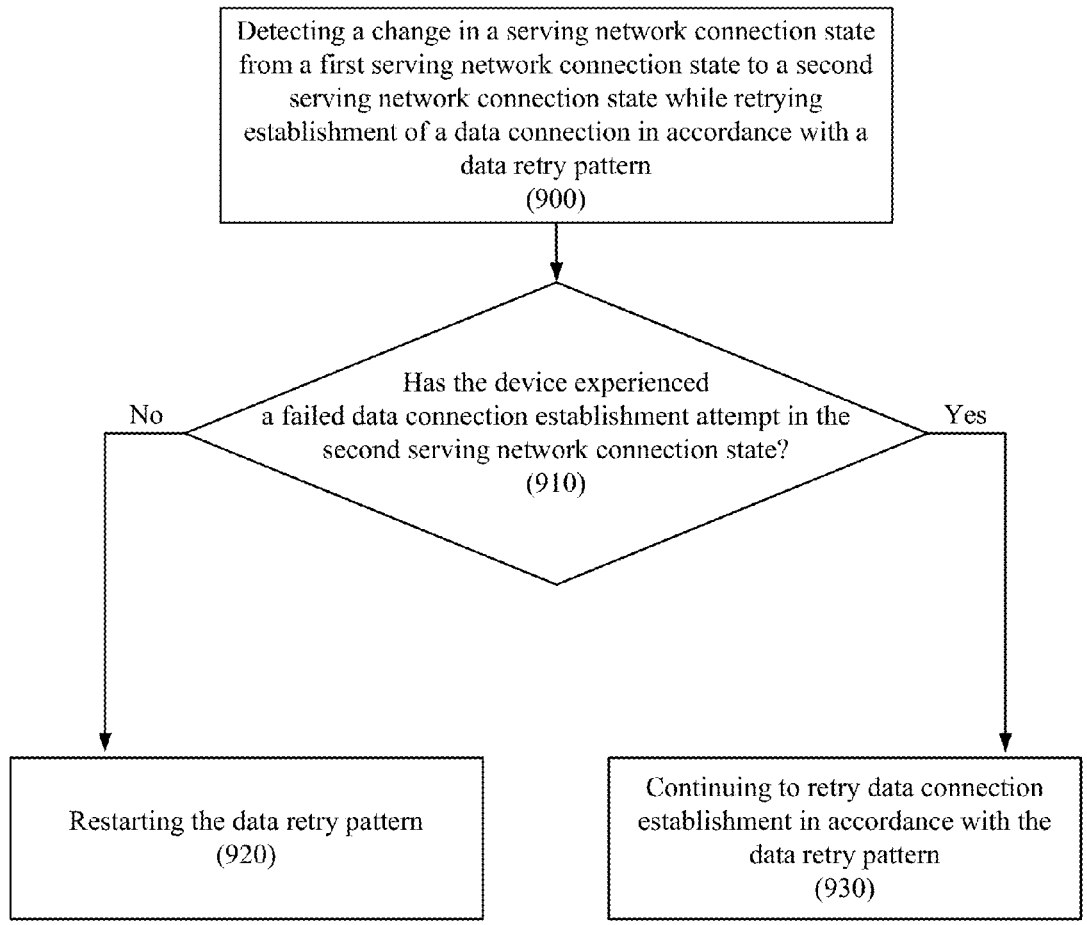
FIG. 9 illustrates a flowchart according to an example method for adaptive data connection retry by a wireless communication device in the event of a change in a serving network connection state according to some example embodiments.

FIG. 9 illustrates a flowchart according to an example method for adaptive data connection retry by a wireless communication device in the event of a change in a serving network connection state according to some example embodiments. In this regard, FIG. 9 illustrates operations that can be performed by a wireless communication device 302 in accordance with some example embodiments. One or more of processing circuitry 410, processor 412, memory 414, transceiver 416, or connection establishment module 418 can, for example, provide means for performing the operations illustrated in and described with respect to FIG. 9. Operation 900 can include detecting a change in a serving network connection state from a first serving network connection state to a second serving network connection state while retrying establishment of a data connection in accordance with a data retry pattern. The data retry pattern can, for example, be a data retry pattern defined and selected based at least in part on an application which has requested a data connection in accordance with one or more embodiments described above. The wireless communication device 302 of such example embodiments can maintain a record of data connection establishment attempt failures previously experienced by the wireless communication device 302. The maintained record can be time limited, such as within a most recent period of time (e.g., within the last d days, w weeks, m months, or the like). Alternatively, the record can include all historic data connection establishment attempt failures experienced by the wireless communication device 302. A recorded data connection establishment attempt failure that can be maintained in the record can be stored in association with a respective serving network connection state in which the data connection establishment attempt failure was experienced. Accordingly, the record can be used to determine whether the wireless communication device 302 has previously experienced a data connection establishment attempt failure in a given serving network connection state. In some example embodiments, the record of data connection establishment failures can be a software cache storing previous, such as recent, cellular data failures with associated network-RAT-routing area mappings. The software cache of some such example embodiments can further include failure causes of recorded data connection establishment failures.

Operation 910 can include determining whether the wireless communication device 302 has experienced a failed data connection establishment attempt in the second serving network connection state. In some example embodiments, operation 910 can include using the record of data connection establishment attempt failures previously experienced by the wireless communication device 302 to determine whether the wireless communication device 302 has experienced a failed data connection establishment attempt in the second serving network connection state. In an instance in which it is determined at operation 910 that the device has not experienced a failed data connection establishment attempt in the second serving network connection state, the method can proceed to operation 920, which can include restarting the data retry pattern. Thus, for example, the wireless communication device 302 can restart with the first retry attempt of a fast retry portion of the data retry pattern. If, however, it is determined at operation 910 that the device has experienced a failed data connection establishment attempt in the second serving network connection state, the method can proceed to operation 930, which can include continuing to retry data connection establishment in accordance with the data retry pattern. Thus, for example, the wireless communication device 302 can continue with the next retry attempt and interval in sequence as defined by the data retry pattern. In this regard, such example embodiments provide for using a more aggressive retry mechanism in a new serving network connection state if a failure has not been previously, or at least recently, experienced in that serving network connection state.

Figure 10:
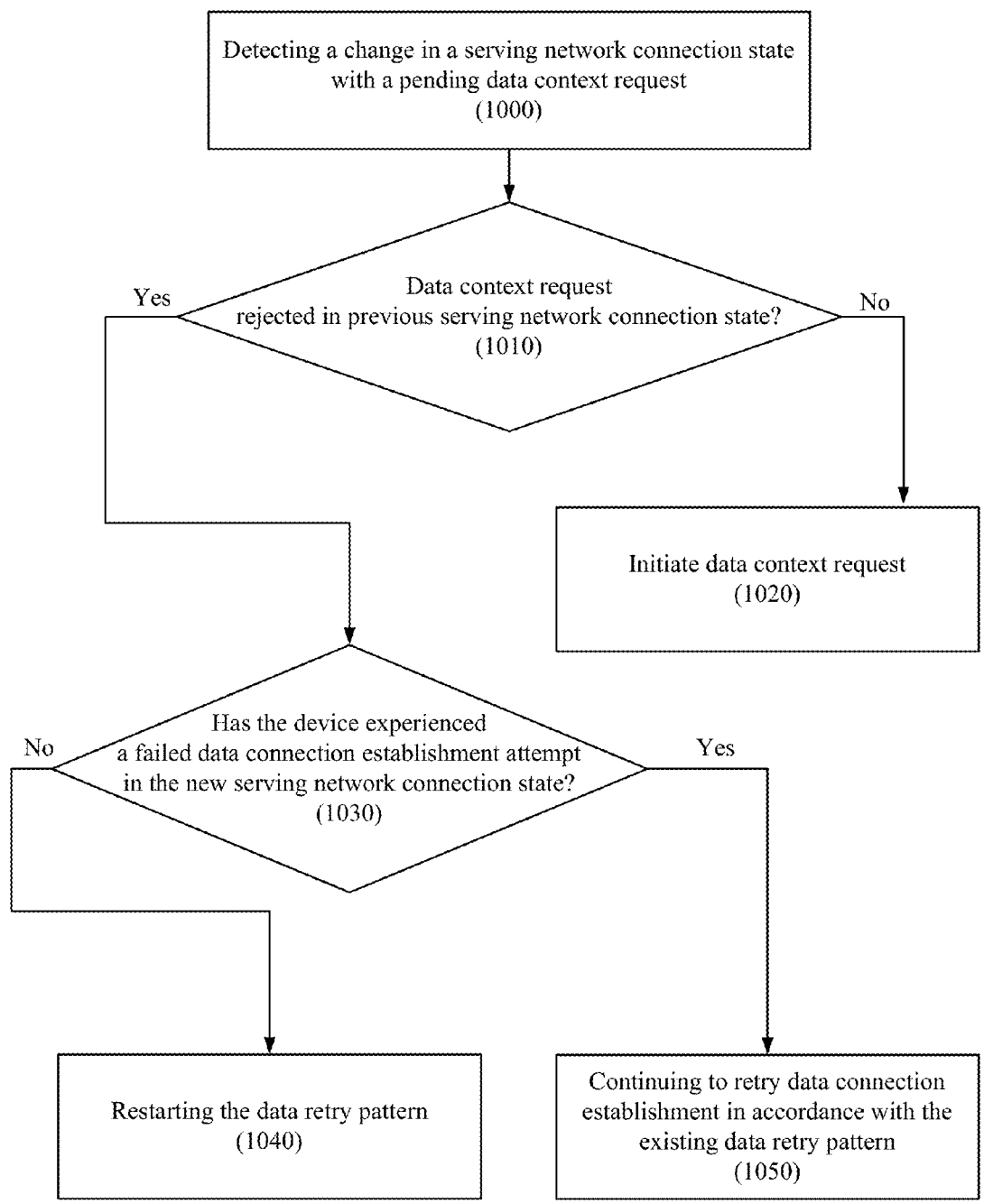
FIG. 10 illustrates a flowchart according to another example method for adaptive data connection retry by a wireless communication device in the event of a change in a serving network connection state according to some example embodiments.

FIG. 10 illustrates a flowchart according to another example method for adaptive data connection retry by a wireless communication device in the event of a change in a serving network connection state according to some example embodiments. In this regard, FIG. 10 illustrates operations that can be performed by a wireless communication device 302 in accordance with some example embodiments. One or more of processing circuitry 410, processor 412, memory 414, transceiver 416, or connection establishment module 418 can, for example, provide means for performing the operations illustrated in and described with respect to FIG. 10. Operation 1000 can include the wireless communication device 302 detecting a change in a serving network connection state with a pending data context request from an application. Operation 1010 can include determining whether the data context request was rejected in the previous serving network connection state. The wireless communication device 302 of such example embodiments can maintain a record of data connection establishment attempt failures previously experienced by the wireless communication device 302. The maintained record can be time limited, such as within a most recent period of time (e.g., within the last d days, w weeks, m months, or the like). Alternatively, the record can include all historic data connection establishment attempt failures experienced by the wireless communication device 302. A recorded data connection establishment attempt failure that can be maintained in the record can be stored in association with a respective serving network connection state in which the data connection establishment attempt failure was experienced. Accordingly, the record can be used to determine whether the wireless communication device 302 has previously experienced a data connection establishment attempt failure in a given serving network connection state. In some example embodiments, the record of data connection establishment failures can be a software cache storing previous, such as recent, cellular data failures with associated network-RAT-routing area mappings. The software cache of some such example embodiments can further include failure causes of recorded data connection establishment failures. Operation 1010 can accordingly include using a maintained record of data connection establishment attempt failures previously experienced by the wireless communication device 302 to determine whether the data context request was rejected in the previous serving network connection state in some example embodiments.

If the data context request was not rejected in the previous serving network connection state, the method can proceed to operation 1020, which can include initiating the data context request.

If, however, it is determined at operation 1010 that the data context request was rejected in the previous serving network connection state (e.g., an active data retry mechanism is being applied following a failed data connection establishment attempt), the method can proceed to operation 1030. Operation 1030 can include determining whether the wireless communication device 302 has experienced a failed data connection establishment attempt in the new serving network connection state. In an instance in which it is determined at operation 1030 that the device has not experienced a failed data connection establishment attempt in the new serving network connection state, the method can proceed to operation 1040, which can include restarting the data retry pattern. Thus, for example, the wireless communication device 302 can restart with the first retry attempt of a fast retry portion of the data retry pattern. If, however, it is determined at operation 1030 that the device has experienced a failed data connection establishment attempt in the new serving network connection state, the method can proceed to operation 1050, which can include continuing to retry data connection establishment in accordance with the data retry pattern. Thus, for example, the wireless communication device 302 can continue with the next retry attempt and interval in sequence as defined by the data retry pattern.

Figure 11:
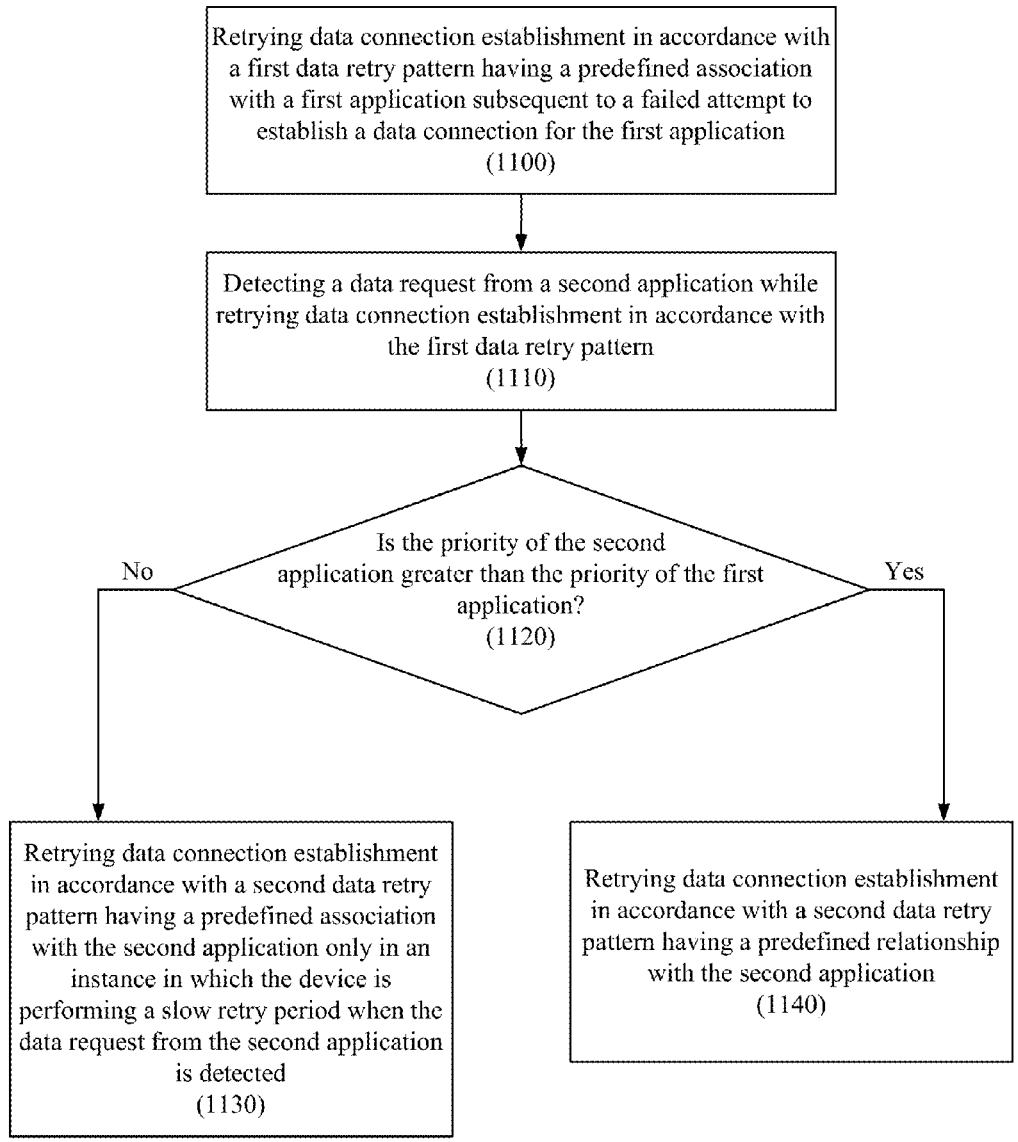
FIG. 11 illustrates a flowchart according to an example method for adaptive data connection retry by a wireless communication device when multiple applications have made a data request according to some example embodiments.

Some example embodiments provide for adaptive data retry in an instance in which a second application has requested data while a wireless communication device 302 is performing data connection retry attempts following a failure to establish a data connection for a first application. FIG. 11 illustrates a flowchart according to an example method for adaptive data connection retry by a wireless communication device when multiple applications have made a data request according to some example embodiments. In this regard, FIG. 11 illustrates operations that can be performed by a wireless communication device 302 in accordance with some example embodiments. One or more of processing circuitry 410, processor 412, memory 414, transceiver 416, or connection establishment module 418 can, for example, provide means for performing the operations illustrated in and described with respect to FIG. 11. Operation 1100 can include the wireless communication device 302 retrying data connection establishment in accordance with a first data retry pattern having a predefined association with a first application subsequent to a failed attempt to establish a data connection for the first application. Operation 1110 can include detecting a data request from a second application on the wireless communication device 302 while retrying data connection establishment in accordance with the first data retry pattern.

Operation 1120 can include determining whether the priority of the second application is greater than the priority of the first application. In an instance in which it is determined at operation 1120 that the priority of the second application is not greater than the priority of the first application, the method can proceed to operation 1130, which can include retrying data connection establishment in accordance with a second data retry pattern having a predefined association with the second application only in an instance in which the device is performing a slow retry period when the data request from the second application is detected. In this regard, in instances in which the priority of the first application is greater and data retry is in a fast retry period, the data retry pattern associated with the first application can continue to be applied. However, if in a slow retry period, a data retry pattern associated with the second application can be applied in spite of the lower priority of the second application so that data retry attempts are more aggressive by applying the fast retry period of the second data retry pattern due to the additional data request form the second application.

If, however, it is determined at operation 1120 that the priority of the second application is greater than the priority of the first application, the method can proceed to operation 1140, which can include retrying data connection establishment in accordance with a second data retry pattern having a predefined relationship with the second application rather than continuing to apply the first data retry pattern.

Figure 12:
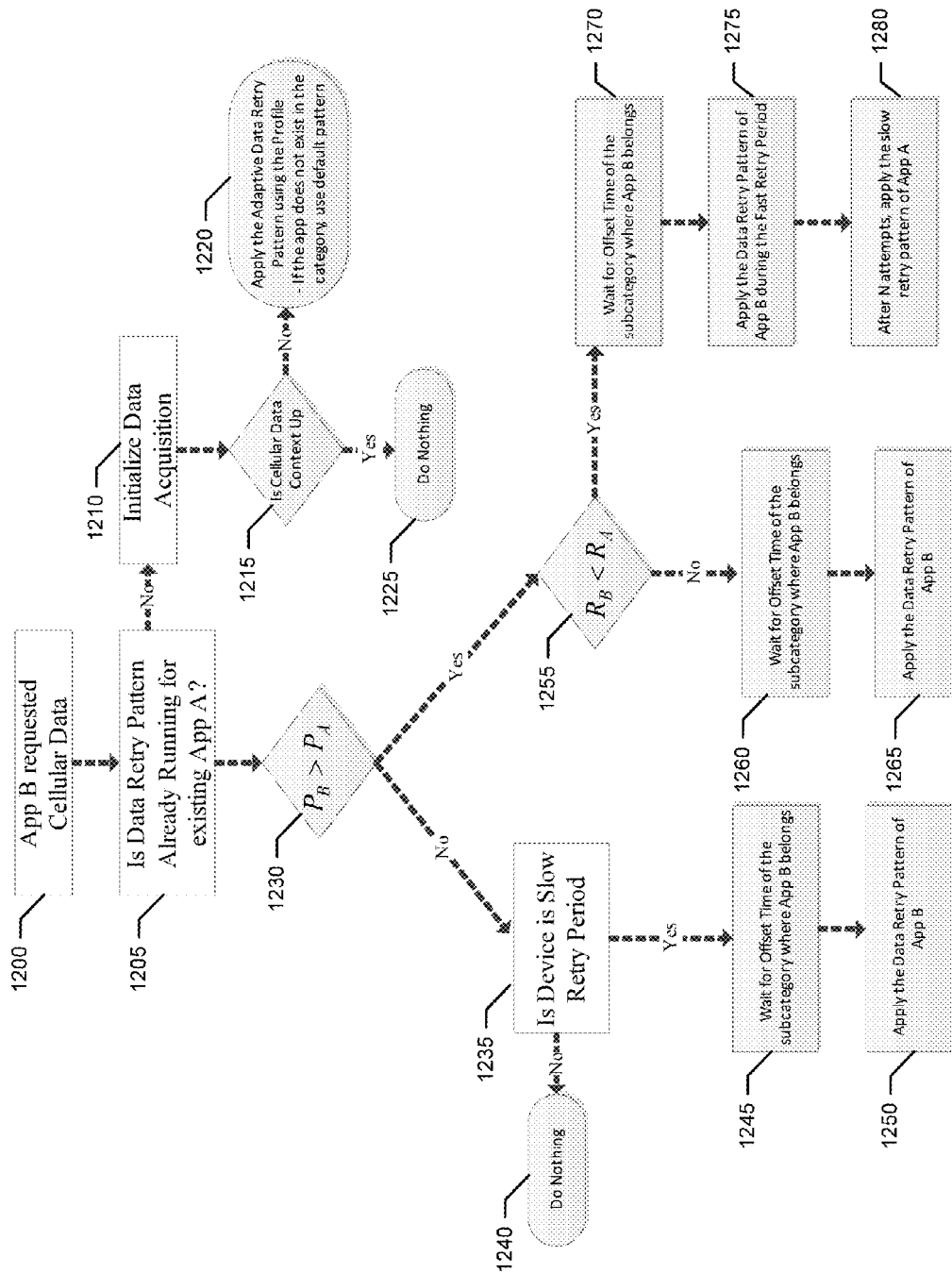
FIG. 12 illustrates a flowchart according to another example method for adaptive data connection retry by a wireless communication device when multiple applications have made a data request according to some example embodiments.

FIG. 12 illustrates a flowchart according to another example method for adaptive data connection retry by a wireless communication device when multiple applications have made a data request according to some example embodiments. In this regard, FIG. 12 illustrates operations that can be performed by a wireless communication device 302 in accordance with some example embodiments. One or more of processing circuitry 410, processor 412, memory 414, transceiver 416, or connection establishment module 418 can, for example, provide means for performing the operations illustrated in and described with respect to FIG. 12. Operation 1200 can include detecting that application B has requested cellular data. Operation 1205 can include determining whether a data retry pattern is already running for application A, which previously requested cellular data.

In an instance in which it is determined at operation 1205 that a data retry pattern is not already running for application A, the method can proceed to operation 1210, which can include initializing data acquisition for application B. Operation 1215 can include determining whether a cellular data context is up (e.g., whether a data connection was successfully established). In an instance in which a data connection was not successfully established, the method can proceed to operation 1220, which can include applying a data retry pattern associated with application B. If a data retry pattern is not already defined as associated with application B, a default data retry pattern can be applied. If, however, it is determined at operation 1215 that a data connection was successfully established, the method can conclude with operation 1225.

In an instance in which it is determined at operation 1205 that a data retry pattern is already running for application A, the method can proceed to operation 1230 rather than to operation 1210. Operation 1230 can include determining whether the priority of application B ($P_B$) is greater than the priority of application A ($P_A$). In an instance in which it is determined at operation 1230 that $P_B$ is not greater than $P_A$, the method can proceed to operation 1235, which can include determining whether the device is in a slow retry period. If the device is not in a slow retry period, such as if a data retry pattern running for application A is in a fast retry period, the method can conclude with operation 1240. If, however, the device is in a slow retry period, the method can proceed to operation 1245, which can include waiting for an offset time associated with application B, such as an offset time associated with a category/subcategory of the application, as may be determined based on device context and/or other factors in accordance with one or more embodiments described above. After waiting for the offset time, the method can proceed to operation 1250, which can include applying the data retry pattern associated with application B.

If, however, it is determined at operation 1230 that $P_B$ is greater than $P_A$, the method can proceed to operation 1255 rather than to operation 1235. Operation 1255 can include determining whether the R value of the data retry pattern associated with application B ($R_B$) is less than an R value of the data retry pattern associated with application A ($R_A$). This condition can be true in an instance in which the data retry pattern associated with application B does not include a slow retry period, while the data retry pattern associated with application A does include a slow retry period. If the condition checked in operation 1255 is not true, the method can proceed to operation 1260, which can include waiting for an offset time associated with application B, such as an offset time associated with a category/subcategory of the application, as may be determined based on device context and/or other factors in accordance with one or more of the techniques described below. After waiting for the offset time, the method can proceed to operation 1265, which can include applying the data retry pattern associated with application B.

If, however, the condition checked in operation 1255 is determined to be true (e.g., an instance in which the data retry pattern associated with application B does not include a slow retry period, while the data retry pattern associated with application A does include a slow retry period), the method can proceed to operation 1270, which can include waiting for an offset time associated with application B, such as an offset time associated with a category/subcategory of the application, as may be determined based on device context and/or other factors in accordance with one or more of the techniques described below. After waiting for the offset time, the method can proceed to operation 1275, which can include applying the fast retry period of the data retry pattern associated with application B. After performing the N attempts and respective intervals of the fast retry period of the data retry pattern associated with application B, the slow retry pattern of application A can be applied in operation 1280.

In some example embodiments, an application can have a priority range rather than a fixed priority. Thus, for example, an application can have a maximum and minimum priority and, in some cases, a range of one or more priorities in between the maximum and minimum priority. The priority of an application at the time of a data request can, for example, be determined based at least in part on device and/or user context information, such as mobility state, location, user usage characteristics, and/or the like at the time of a request.

In some example embodiments, the offset associated with an application can have a range of values rather than being a fixed offset. Thus, for example, an application can have a maximum associated offset and a minimum associated offset and, in some cases, a range of one or more offset values in between the maximum and minimum offset values. The offset time to use before applying the data retry pattern of the second application, such as in the example method of FIG. 12 can be determined based at least in part on device and/or user context information, such as mobility state, location, user usage characteristics, and/or the like.

In some example embodiments, if both a first application and a second application (e.g., application A and application B in the example of FIG. 12) are categorized in the same category, then a data retry pattern of the first application can be continued regardless of a relationship between the respective priorities of the first application and the second application. In this regard, data retry pattern overwrite can be disabled in some embodiments for applications within the same category.

In some example embodiments, an application category can be accorded a certain priority. In such embodiments, if a first application (e.g., application A in the example of FIG. 12) is in a category having a priority satisfying a threshold level (e.g., a high priority category), then overwrite of a data retry pattern associated with the first application by a data retry pattern associated with a second requesting application (e.g., application B in the example of FIG. 12) can be disabled regardless of a relationship between the respective priorities of the first application and the second application.

In some example embodiments, a maximum number of data connection retry attempts can be defined for an application within a certain period of time, such as within a short term period (e.g., 15 minutes by way of non-limiting example) and/or within a long term period (e.g., 24 hours by way of non-limiting example). Additionally or alternatively, in some example embodiments, a maximum number of data connection retry attempts can be defined for an application category/subcategory within a certain period of time, such as within a short term period (e.g., 15 minutes by way of non-limiting example) and/or within a long term period (e.g., 24 hours by way of non-limiting example).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for adaptive data connection retry by a wireless communication device, the method comprising:
by the wireless communication device:
detecting a failed attempt by the wireless communication device to establish a data connection for a first application associated with an application category;
selecting a data retry pattern from a set of predefined data retry patterns based on the application category;
retrying data connection establishment in accordance with the selected data retry pattern;
detecting a data request from a second application while retrying data connection establishment in accordance with the selected data retry pattern; and
when:
(i) a second priority associated with the second application is greater than a first priority associated with the first application, or
(ii) the second priority is not greater than the first priority and the data request from the second application is detected while the wireless communication device is performing a slow retry period defined by the selected data retry pattern:
retrying data connection establishment in accordance with a second data retry pattern having a predefined association with the second application.

2. The method of claim 1, wherein:
the selected data retry pattern defines a maximum number of data connection retry attempts to perform during a fast retry period and intervals between respective data connection retry attempts during the fast retry period, and
the selected data retry pattern further indicates whether the slow retry period is to be performed following the fast retry period in an instance in which a data connection is not successfully established during the fast retry period,
wherein interval periods in the fast retry period are shorter than interval periods in the slow retry period.

3. The method of claim 1, wherein the selected data retry pattern is defined based at least in part on one or more of an average duration of use or a frequency of use of the first application.

4. The method of claim 1, wherein in an instance in which the first application is a persistent application needing a constant data connection to function, a more aggressive data retry pattern is selected than in an instance in which the first application is a non-persistent application that does not need a constant data connection to function.

5. The method of claim 1, wherein selecting the data retry pattern comprises selecting the data retry pattern based at least in part on whether the first application is categorized as a trusted application.

6. The method of claim 1,
wherein the set of predefined data retry patterns are based at least in part on application usage data collected by a network entity from a plurality of wireless communication devices.

7. The method of claim 6, wherein the set of predefined data retry patterns is based on use in a geographic area in which the wireless communication device is operating based at least in part on application usage data collected by the network entity from a plurality of wireless communication devices operating within the geographic area.

8. The method of claim 6, further comprising:
providing application usage data for usage of the first application on the wireless communication device to the network entity; and
receiving, at the wireless communication device, an updated set of data retry patterns defined by the network entity based at least in part on updated application usage data.

9. The method of claim 1, wherein each of a plurality of applications have requested a data connection, including an application running in a foreground and an application running in a background; and
wherein selecting the data retry pattern comprises selecting a data retry pattern having a predefined association with the application running in the foreground.

10. The method of claim 1, further comprising:
detecting a change in a serving network connection state occurring due to mobility of the wireless communication device while retrying establishment of the data connection;
determining whether the wireless communication device has experienced a failed data connection establishment attempt in a new serving network connection state within a previous period of time;
in an instance in which the wireless communication device has experienced a failed data connection establishment attempt in the new serving network connection state within the previous period of time, continuing to retry data connection establishment in accordance with the selected data retry pattern; and
in an instance in which the wireless communication device has not experienced a failed data connection establishment attempt in the new serving network connection state within the previous period of time, restarting the selected data retry pattern with a first retry attempt of a fast retry portion of the selected data retry pattern.

11. The method of claim 1, wherein the selecting the data retry pattern is further based on a mobility state of the wireless communication device.

12. The method of claim 1, wherein the selecting the data retry pattern is further based on a context of the wireless communication device comprising a user activity status.

13. The method of claim 12, wherein the user activity status comprises an on/off state of a display screen of the wireless communication device.

14. The method of claim 1, wherein the selecting the data retry pattern is further based on a context of the wireless communication device comprising a time of day at which the data connection is attempted.

15. The method of claim 1, wherein the selecting the data retry pattern is further based on a context of the wireless communication device comprising a radio access technology in use by the wireless communication device.

16. The method of claim 1, wherein the selecting the data retry pattern is further based on a context of the wireless communication device comprising a geographic location of the wireless communication device.

17. The method of claim 1, wherein the data retry pattern defines a set of interval periods that occur between data retry attempts, and values for interval periods in the set of interval periods are based on the first application.

18. A wireless communication device comprising:
  a transceiver configured to transmit data to and receive data from a wireless network; and
  processing circuitry coupled to the transceiver, the processing circuitry configured to control the wireless communication device to at least:
    detect a failed attempt to establish a data connection for a first application associated with an application category;
    select a data retry pattern from a set of predefined data retry patterns based on the application category;
    retry data connection establishment in accordance with the selected data retry pattern;
    detect a data request from a second application while retrying data connection establishment in accordance with the selected data retry pattern; and
    when:
      (i) a second priority associated with the second application is greater than a first priority associated with the first application, or
      (ii) the second priority is not greater than the first priority and the data request from the second application is detected while the wireless communication device is performing a slow retry period defined by the selected data retry pattern:
        retry data connection establishment in accordance with a second data retry pattern having a predefined association with the second application.

19. The wireless communication device of claim 18, wherein:
  the selected data retry pattern defines a maximum number of data connection retry attempts to perform during a fast retry period and intervals between respective data connection retry attempts during the fast retry period, and
  the selected data retry pattern further indicates whether the slow retry period is to be performed following the fast retry period in an instance in which a data connection is not successfully established during the fast retry period,
  wherein interval periods in the fast retry period are shorter than interval periods in the slow retry period.

20. The wireless communication device of claim 18, wherein the selected data retry pattern is defined based at least in part on one or more of an average duration of use or a frequency of use of the first application.

21. The wireless communication device of claim 18, wherein in an instance in which the first application is a persistent application needing a constant data connection to function, a more aggressive data retry pattern is selected than in an instance in which the first application is a non-persistent application that does not need a constant data connection to function.

22. The wireless communication device of claim 18, wherein the processing circuitry is further configured to control the wireless communication device to select the data retry pattern based at least in part on whether the first application is categorized as a trusted application.

23. The wireless communication device of claim 18, wherein the set of predefined data retry patterns are based at least in part on application usage data collected by a network entity from a plurality of wireless communication devices.

24. The wireless communication device of claim 23, wherein the set of predefined data retry patterns comprises a set of data retry patterns defined for use in a geographic area in which the wireless communication device is operating based at least in part on application usage data collected by the network entity from a plurality of wireless communication devices operating within the geographic area.

25. The wireless communication device of claim 23, wherein the processing circuitry is further configured to control the wireless communication device to:
  provide application usage data for usage of the first application on the wireless communication device to the network entity; and
  receive an updated set of data retry patterns defined by the network entity based at least in part on updated application usage data.

26. The wireless communication device of claim 18, wherein the processing circuitry is further configured to select the data retry pattern based on a context of the wireless communication device comprising one or more of: user activity status, a time of day at which the data connection is attempted, or a geographic location of the wireless communication device.

27. The wireless communication device of claim 18, wherein the data retry pattern defines a set of interval periods that occur between data retry attempts, and values for interval periods in the set of interval periods are based on the first application.

28. A method for adaptive data connection retry by a wireless communication device, the method comprising:
  detecting a change in a serving network connection state from a first serving network connection state to a second serving network connection state occurring due to mobility of the wireless communication device while the wireless communication device is retrying establishment of a data connection in accordance with a data retry pattern subsequent to a failed data connection establishment attempt in the first serving network connection state;
  determining, by a processor implemented on the wireless communication device, whether the wireless communication device has experienced a failed data connection establishment attempt in the second serving network connection state within a previous period of time;
  in an instance in which the wireless communication device has experienced a failed data connection establishment attempt in the second serving network connection state within the previous period of time, continuing to retry data connection establishment in accordance with the data retry pattern; and
  in an instance in which the wireless communication device has not experienced a failed data connection establishment attempt in the second serving network connection state within the previous period of time, restarting the data retry pattern with a first retry attempt of a fast retry portion of the selected data retry pattern.

29. The method of claim 28, further comprising:
  maintaining a record of data connection establishment attempt failures experienced by the wireless communication device, wherein each recorded data connection establishment attempt failure is stored in association with a respective serving network connection state in which the data connection establishment attempt failure was experienced; and wherein determining whether the wireless communication device has experienced a failed data connection establishment attempt in the second serving network connection state within the previous period of time comprises using the record of data connection establishment attempt failures to determine whether the wireless communication device has experienced a failed data connection establishment attempt in the second serving network connection state within the previous period of time.

30. The method of claim 28, wherein the change in the serving network connection state comprises one or more of a change from a first serving network to a second serving network, a change from a first radio access technology (RAT) to a second RAT, a change from a first routing area identifier (RAI) to a second RAI, or a change from a first location area identity (LAI) to a second LAI.

31. The method of claim 28, wherein the failed data connection establishment attempt in the first serving network connection state comprises a failed attempt to establish a data connection for an application, and wherein the data retry pattern comprises a data retry pattern having a predefined association with the application, the data retry pattern having been selected from a set of predefined data retry patterns defined based at least in part on application usage data collected by a network entity from a plurality of wireless communication devices.

* * * * *